Figure 1:
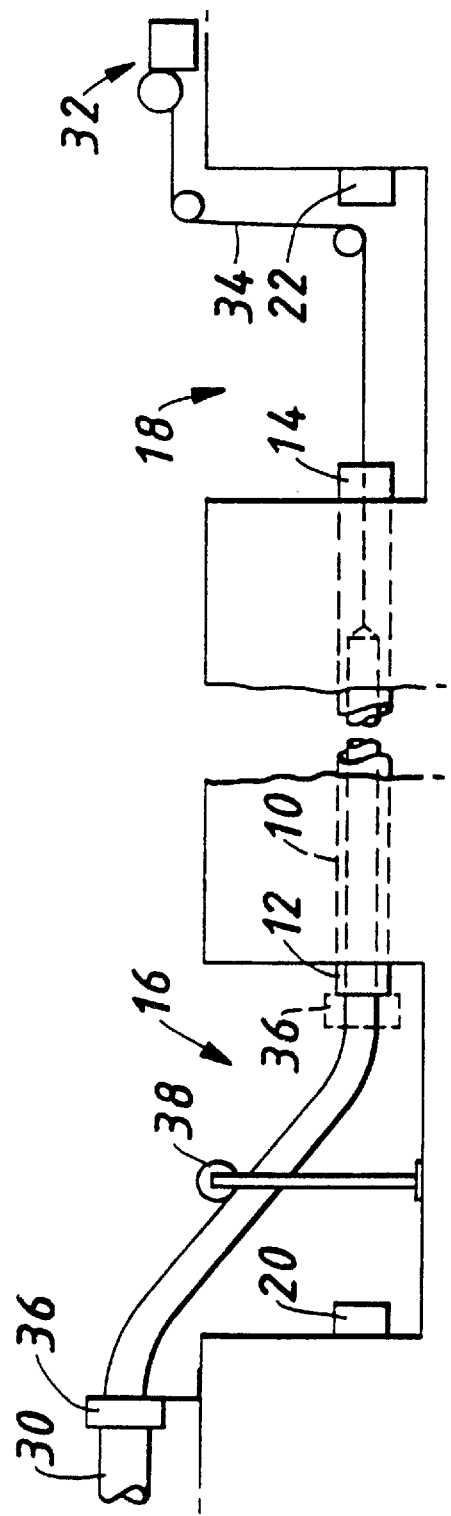

United States Patent [19]
Maine et al.

[11] Patent Number: 5,839,475
[45] Date of Patent: Nov. 24, 1998

[54] METHOD AND APPARATUS FOR LINING A PIPE WITH A POLYMER LINEAR

[75] Inventors: Leslie Maine, Northumberland; Kenneth Hicks, Tyne & Wear, both of Great Britain

[73] Assignee: British Gas PLC, London, Great Britain

[21] Appl. No.: 702,455

[22] PCT Filed: Mar. 31, 1995

[86] PCT No.: PCT/GB95/00738

§ 371 Date: Feb. 24, 1997

§ 102(e) Date: Feb. 24, 1997

[87] PCT Pub. No.: WO95/27168

PCT Pub. Date: Oct. 12, 1995

[30] Foreign Application Priority Data

Mar. 31, 1994 [GB] United Kingdom .................. 9406516

[51] Int. Cl.$^6$ .................................................. F16L 55/16
[52] U.S. Cl. ............................. 138/98; 138/97; 156/294; 156/287; 264/269; 264/516
[58] Field of Search ............................. 138/98, 97, 140; 264/269, 516

[56] References Cited

U.S. PATENT DOCUMENTS

| | | | |
|---|---|---|---|
| 2,249,510 | 7/1941 | Welker | 138/140 X |
| 3,462,825 | 8/1969 | Pope et al. | 138/140 X |

FOREIGN PATENT DOCUMENTS 4109663  9/1992  Germany .

OTHER PUBLICATIONS

European Patent Applications #341,941 McGuire, Nov. 1989.

European Patent Application # 266,951 Whyman. May 1988.

Primary Examiner—Patrick F. Brinson
Attorney, Agent, or Firm—William H. Holt; William R. Hinds

[57] ABSTRACT

A method and apparatus for lining a pipe with a polymer liner in which the liner is pulled through a die to reduce the liner's diameter and through the pipe and on removal of the pulling load, allowing the liner to revert to at least the minimum internal diameter of the pipe, wherein the liner has a maximum diameter before entering the die and a minimum diameter in the die. The die having an aperture which is symmetrical with respect to a central, longitudinal axis and comprising in the direction that the liner is passed an entry, a throat and an exit. The diameter of the aperture decreasing over the entry to a minimum to the throat and increasing over the exit. The entry of the die, when viewed in a sectional plane extending longitudinally of the liner and containing the axis, is convex over substantially an entire axial length between where the liner first contacts the die and the throat, wherein the liner substantially continuously engages the die over substantially the entire axial length.

10 Claims, 2 Drawing Sheets

METHOD AND APPARATUS FOR LINING A PIPE WITH A POLYMER LINEAR

The invention relates to a method of and apparatus for lining a pipe with a polymer liner.

The method is applicable, for example, to lining a buried gas, water or sewage pipe. Such pipes are made of cast iron or steel or particularly, in the case of water, of asbestos cement or concrete for example, and particularly cast iron pipes may be lined with bitumen or concrete.

In British Gas patent application GB-A-2186340 there is described a method applicable to buried gas, water or sewage pipes in which a length of synthetic resin liner is heated, pulled through a die and through the pipe to be lined and pressurised to cause it to expand into engagement with the internal wall of the pipe.

In U.S. Pat. No. 3,462,825 (Pope et al) there is described a method applicable to the lining of flexible or rigid pipes in the factory by pulling a liner through a die and through the pipe and then releasing the liner pipe, whereupon the liner pipe expands into tight engagement with the internal wall of the pipe. The pipe was of relatively small diameter, having an inside diameter of 2.06 inches (51.5 millimeters) and the liner pipe had an outside diameter of 2.3 inches (57.5 mm). The liner pipe was relatively thin, having a wall thickness of 0.07 inch (1.75 mm) giving a Standard Dimension Ratio (SDR) of 33. The liner pipe was of fluorocarbon. In general, the outside diameter of the liner pipe was 10 to 15% greater than the inside diameter of the pipe to be lined.

In British patent specification No. 807 413 (Tubovit Societa per Azioni) there is described a method applicable to the lining of metal pipes in the factory by pulling a heater line pipe through a die and through a pipe to be lined, releasing the liner pipe, and heating the liner pipe. The die diameter is the same as the pipe to be lined or very slightly less. The liner is of polyvinyl chloride very slightly larger than the pipe to be lined and is 3 mm thick or less. The liner is heated before or during the die reduction to a temperature at which it is relatively soft and the force used to pull it through the pipe is only relatively low.

In GB 2186340 such die swell as does occur after the main die is eliminated by the effect of the second die which makes the diameter of the throat, in each case, the diameter which does into the pipe. In U.S. Pat. No. 3,462,825 and GB 807 413, no die swell is shown and the diameter which goes into the pipe is the diameter of the throat. Die swell is the increase in diameter which the liner undergoes after passing through the die.

Our patent No. EP-B-0341941 describes a method of lining a buried pipe with a polymer liner, which comprises pulling a length of liner through a die to reduce its diameter and through the pipe and on removal of the pulling load allowing the liner to revert to at least the minimum internal diameter of the pipe, the liner having a maximum diameter before the die and a minimum diameter in the die, and the die having a central, longitudinal die axis and comprising an entry and a throat which are symmetrical about said axis, the entry decreasing in diameter towards said throat characterised in that the die also comprises an exit which increases in diameter away from said throat and the liner having an intermediate diameter after the die before the liner enters the pipe, the force of pulling being such as partially to restrain die swell of the liner after its emergence from the throat, and the liner bending inwards before first contacting the die at the entry, then leaving the entry before continuously bending through its minimum diameter as it passes the throat, and then undergoing die swell resulting in said intermediate diameter, which enters the pipe.

In that method, the liner bends as it passes through the die.

The present invention modifies the invention described in EP-B-0341941 in that the strain in the liner due to its bending is introduced into the liner more gradually compared with the method described in EP 0341941B. This is achieved using a die in which the entry is curved instead of straight.

Dies having curved internal working surfaces have been proposed in GB-A-807413, U.S. Pat. No. 2,249,510, FR-A-2096557 and AU-A-65481/74. However, none of these proposals resulted in a method of lining a pipe using a polymer lining as proposed in the present invention. The methods disclosed do not deal with a polymer liner which exhibits die swell.

A method of lining a pipe with a polymer liner, according to the invention, comprises pulling the liner through a die to reduce its diameter and through the pipe and on removal of the pulling load allowing the liner to revert to at least the minimum internal diameter of the pipe, the liner having a maximum diameter before the die and a minimum diameter in the die and the die having an aperture which is symmetrical with respect to a central, longitudinal axis and comprising in the direction in which the liner is passed, an entry, a throat and an exit, the diameter of the aperture in said direction decreasing over said entry to a minimum at said throat and increasing over said exit, the liner having an intermediate diameter after the die and before the liner enters the pipe, the force of pulling being such as partially to restrain die swell of the liner after its emergence from the throat and the liner bending towards said axis and in so doing presenting a convex outer surface (when viewed in a sectional plane extending longitudinally of the liner and containing said axis) and then the liner bending away from the axis and in so doing presenting a concave outer surface (when viewed in said plane), the liner continuously bending through its minimum diameter as it passes the throat and thereafter undergoing die swell resulting in said intermediate diameter, which enters the pipe, characterised in that the entry, when viewed in said plane, is convex over an axial length between where the liner first contacts the die after bending inwardly and said throat.

Apparatus for performing that invention, according to the invention comprises in combination upstream of the pipe a die having an aperture which is symmetrical with respect to a central, longitudinal axis and comprising in the direction in which the liner is passed, an entry, a throat and an exit, the diameter of the aperture in said direction decreasing over said entry to a minimum at said throat and increasing over said exit, said die being secured to the surface of the ground or being connected to the leading end of the pipe, guide means for said liner, and downstream of said pipe winch means for exerting a pull on a rope connected to the leading end of liner and guide means for said rope, characterised in that the entry of the die is convex over an axial length between where the liner first contacts the die after bending inwardly and said throat of the die.

Figure 2:
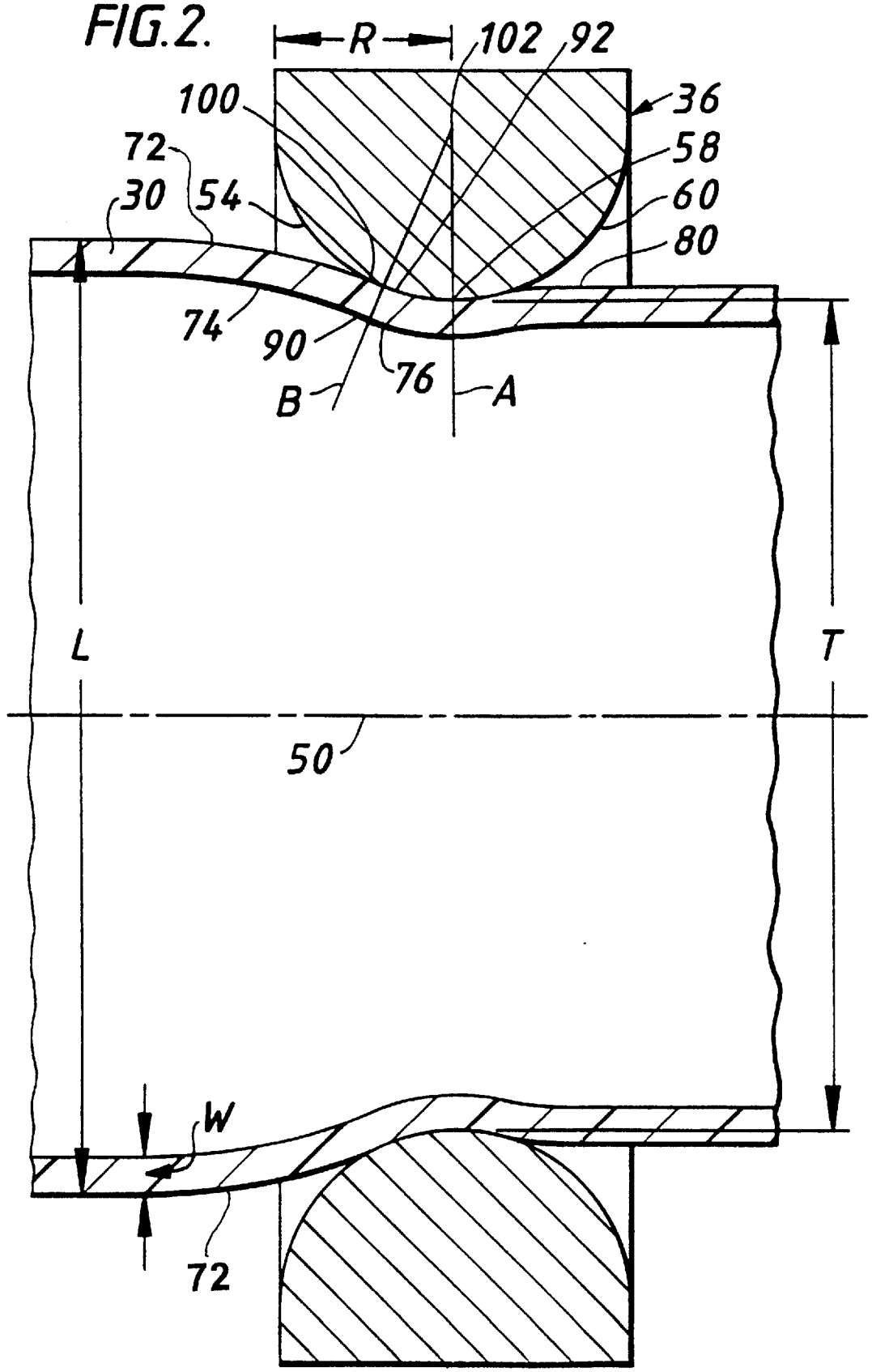

A method of lining a pipe with a polymer lining, and apparatus for performing that method, will now be described by way of example with reference to the accompanying drawings, in which:

FIG. 1 is a vertical section through the ground showing the pipe to be lined and showing the liner pipe in the course of being pulled through the pipe to be lined; and FIG. 2 is an enlarged vertical section through the die and through the liner pipe as it is passing through the die.

The method of lining a pipe using a polymer liner pips is substantially the same as that described in EP-B-0341941 and the whole of the contents of the specification of that patent are incorporated herein by reference. The description which appears in EP-B-0341941 may be taken as a description of the method used in the present invention except for the different die used. A description of the die used according to the present invention appears herein.

The method is as shown in FIG. 1, for example.

From now on, the liner pipe will be referred to as "the liner" and the pipe to be lined will be referred to as "the pipe".

FIG. 1 shows a buried pipe 10, which in this case may be for example a cast-iron gas main, with its ends 12,14 exposed at two excavations 16,18. The pipe continues at 20,22 and pieces have been removed at the excavations 16,18. Eventually, the whole pipe will be lined and the liner joined up to make a continuous main.

The liner 30 is made, for example, of polyethylene and is pulled by a winch 32 and cable 34 through a swaging die 36 and through the pipe 10. The liner 30 after emerging from the die 36 is guided by a roller 38 to facilitate entry into the end 12 of the pipe 10. The die 36 is secured by members (not shown) driven into the ground. In another alternative position, the die 36 is supported by direct engagement with the end 12 of the pipe 10, or with members engaging the end 12. The winch 32 also has to be secured by members (not shown) driven into the ground, or from the end of the pipe 14.

Prior to the operations shown in FIG. 1, the pipe was cleaned and checked for internal size by suitable pigs passed through the pipe. At the same time, any protrusions were removed from within the pipe. The liner was made up of lengths of liner above ground. The lengths of liner were joined end to end by butt fusion and the external bead at each fusion joint was removed or directly inserted from a coil of liner (this being the case in sizes up to 180 mm, for example). A pulling cone was attached to the leading end of the liner. The cable 34 was attached to the end of a stiff rod and the rod was pushed through the pipe 10 from the end 14 to the end 12 until the cable end (at the trailing end of the rod) emerged at the end 12. The cable 34 was disconnected and fed through the die 36 and attached to the cone on the liner. The winch 32 was then operated to draw the liner through the die 36, with the longitudinal extension of the liner being less than 10%, preferably 8%.

The operator of the winch keeps the winch turning at a constant rate, or nearly so. The rate of advance of the liner 30 may for example be 3 meters per minute.

When pulling is completed, the liner is allowed to revert at least to the minimum internal diameter of the pipe. The liner is cut leaving sufficient pipe to enable a suitable connection to be effected. Where the die engages the end of the pipe 10 or a member or members engaging the end of the pipe 10, a split die is essential. The winch cable 34 is removed from the liner 30 which is then cut to allow sufficient length to accommodate contraction as the liner reverts.

FIG. 2 shows the behaviour of the liner 30 as it passes through the steel swaging die 36.

As is shown in FIG. 2, the liner 30 engages the die 36 at its entry 54, the liner wall 74 having bent inwardly to do so. As viewed in the sectional plane represented by FIG. 2 the liner presents a convex outer surface 72 during this stage of bending towards the axis 50. The liner 30 bends away from the axis 50 and in so doing presents a concave interior surface at 76, as viewed in the same sectional plane. Then, the wall bends continuously through its minimum diameter as it passes the throat 58, the outer surface remaining concave. The liner 30 after it leaves the die again bends away from the axis 50 presenting a convex outer surface as it does so. At the point 80 the diameter, which has been increasing after the die, reaches a maximum value. This is defined as "die swell" which enters the pipe 10. After the point 80 the wall 74 bends inwards very slightly to a lesser diameter some distance beyond the region shown in the figure.

The exact amount of die swell is the difference between the diameter at 80 and the minimum or throat diameter at 58 of the die 36.

The die swell has to be taken account of in choosing the parameters of the present invention. Thus, in this invention, it is the diameter of the liner, including die swell, which is chosen to be less than the minimum bore diameter of the pipe 10.

The pulling force is kept preferably at about half the yield strength of the liner, and the die 36 is dimension to ensure that the die swell is just at the correct value. Preferably, the choice is made to allow the liner 30 to be pulled into the pipe 10 with a "window" to allow the pull to be stopped for say, for example, 30 minutes if necessary.

The die acts as a means of reducing the liner diameter through its profile and frictional resistance. Work on the liner is primarily bending.

The liner 30 (FIG. 2) approaches the die 36 and bends towards the axis 50. The external surface of the liner 30 is convex as viewed in this section.

Then, the liner 30 contacts the entry 54 of the die 36, the entry being the whole of the arcuate surface up to but not including the throat 58. It is not easy to differentiate these portions on the figure shown. To make it easier a radial line normal to the internal surface at the throat 58 has been drawn on the figure. The entry 54 is the whole of the internal arcuate surface of the die 36 to the left of the line A. The throat 58 is at the line A. To the right of the line A is the exit 60.

At about the region 90 the liner 30 reverses its bending and bends away from the axis 50. In so doing it presents a concave outer surface.

The die 36, according to the invention, is different from the die shown in our patent EP-B-0341941 in that instead of having a straight section to the entry 54 at this point, the die 36 has an inwardly convex surface 92. The inwardly convex surface 92 matches as far as possible the outer concave surface of the liner 30.

The liner 30 contacts the die 36 for the first time at the point 100. A line B normal to the die surface has been drawn on the figure. Compared with the method described in EP-B-0341941, the liner engages the die continuously up to the throat 58. Therefore, the strain introduced into the liner 30 by the die 36 is introduced more gradually over the arc of the surface of the through aperture between the lines A and B as compared with the method described in EP-B-0341941.

The dimensions shown in FIG. 2 are as follows:

L: 160 millimeters (nominal)

T: 140 millimeters

W: 10 millimeters

R: 30 millimeters

A second die, similar to that described but in which T=144 mm instead of 140 mm was used to produce the following results:

| Original Diameter | mm | ( 160.8 | (a) |
| --- | --- | --- | --- |
|  | " | ( 160.7 | (b) |
| Diameter after die (while under load) measured at 80 | mm | ( 149.4 | (a) |
|  | " | ( 150.4 | (b) |
| Diameter after die with load removed : after 1 hour | mm | ( 155.5 | (a) |
|  | " | ( 155.6 | (b) |
| Diameter after die, Final | mm | ( 156.7 | (a) |
|  | " | ( 156.8 | (b) |
| Pulling Load | Tonnes | ( 2.63 | (a) |
|  | " | ( 1.99 | (b) |
| % Axial Strain while under load |  | ( 8.1 | (a) |
|  |  | ( 6.9 | (b) |
| % Axial Strain with load removed : after 1 hour |  | ( 2.9 | (a) |
|  |  | ( 2.7 | (b) |
| % Axial Strain with load removed, Final |  | ( 2.1 | (a) |
|  |  | ( 1.9 | (b) |

Using such a die, the following results were obtained performing the method with the die and pipe (a) dry and (b) lubricated with water:

| Original Diameter (mm) |  | ( 160.8 | (a) |
| --- | --- | --- | --- |
|  |  | ( 160.7 | (b) |
| Diameter after die (while under load) measured at 80 | mm | ( 145.6 | (a) |
|  | " | ( 146.4 | (b) |
| Diameter after die with load removed : after 1 hour | mm | ( 153.1 | (a) |
|  | " | ( 153.4 | (b) |
| Diameter after die, Final | mm | ( 154.9 | (a) |
|  | " | ( 155.2 | (b) |
| Pulling Load | Tonnes | ( 2.9 | (a) |
|  | " | ( 2.36 | (b) |
| % Axial Strain while under load |  | ( 11.4 | (a) |
|  |  | ( 10.0 | (b) |
| % Axial Strain with load removed : after 1 hour |  | ( 4.6 | (a) |
|  |  | ( 3.8 | (b) |
| % Axial Strain with load removed, Final |  | ( 3.2 | (a) |
|  |  | ( 2.7 | (b) |

All of those tests were performed at an ambient temperature of 18 degrees Centigrade, no heat being applied to the liner pipe or die. The liner pipe was made of PE-X grade polyethylene.

It is to be noted from those results that, as the load is reduced (eg by the effect of lubrication) the diameter measured at 80 while the line pipe is still under load (ie the diameter of the liner pipe including die swell) increases.

It is preferred to use lubricant while performing the method according to the invention. However, judgement has to be exercised in choosing the size of the die in relation to the diameter of the liner pipe before reduction to give the correct clearance between the liner pipe and the pipe to be lined during installation, adequate recovery of the liner pipe diameter, when the load has been removed, must be achieved so as to produce a final lined pipe in which the liner pipe is a close fit.

The invention is applicable to other grades of polyethylene besides PEX for example to high density (HDPE) and to medium density (MDPE) grades, as well as to cross-linked polyethylene. It is also applicable to polypropylene. The invention can be applied to line cast iron and steel pipelines, including buried pipelines and installed pipelines. In general long lengths of pipeline can be lined (eg 200 meters). The invention can be used to line steel pipe before the pipes are joined up to make an even greater length and before the pipeline is installed in its final position. Each pipe to be lined in that case can be 150 meters long, for example.

The standard dimension ratio of the liner pipe may be 33, for example, or a lower value such as SDR 26, 17 or 11 for example, may be used. Standard dimensions ratio means that the quotient obtained by dividing the outer diameter of the liner pipe L by the wall thickness W. Depending on wall thickness, the final lined pipe may be regarded as equivalent to a stand-alone plastic pipe. In other words, such a pipe would be capable of sustaining the rated pressure of gas, or water or other product to be conducted without any reliance being placed on the original cast iron or steel outer pipe. On the other hand the liner pipe may be merely a liner inserted for purposes of corrosion protection, for example, but not having the ability to withstand the pressure of the conducted fluid without benefiting from the strength of the surrounding pipe, eg made of steel.

In this specification, the term "liner pipe" means a liner used to produce either a stand alone plastic pipe or a liner merely housing anti-corrosion or other properties not related to pressure resistance.

We claim:

1. A method of lining a pipe with a polymer liner comprises pulling the liner through a die to reduce its diameter and through the pipe and on removal of the pulling load allowing the liner to revert to at least the minimum internal diameter of the pipe, the liner having a maximum diameter before the die and a minimum diameter in the die and the die having an aperture which is symmetrical with respect to a central, longitudinal axis and comprising in the direction in which the liner is passed, an entry, a throat and an exit, the diameter of the aperture in said direction decreasing over said entry to a minimum at said throat and increasing over said exit, the liner having an intermediate diameter after the die and before the liner enters the pipe, the force of pulling being such as partially to restrain die swell of the liner after its emergence from the throat and the liner bending towards said axis and in so doing presenting a convex outer surface, when viewed in a sectional plane extending longitudinally of the liner and containing said axis, and then the liner bending away from the axis and in so doing presenting a concave outer surface, when viewed in said plane, the liner continuously bending through its minimum diameter as it passes the throat and thereafter undergoing die swell resulting in said intermediate diameter, which enters the pipe, characterised in that said entry, when viewed in said plane, is convex over substantially an entire axial length between where the liner first contacts the die after bending inwardly and said throat and said liner substantially continuously engages said die over substantially the entire axial length.

2. A method according to claim 1 in which the shape of said axial length is defined in said plane and in corresponding planes, as the shape of a circular arc.

3. A method according to claim 1 in which said axial length of said die engages the whole of said concave outer surface of the liner up to said throat.

4. In combination apparatus for performing the method according to claim 1 comprising upstream of the pipe a die having an aperture which is symmetrical with respect to a central, longitudinal axis and comprising in the direction in which the liner is passed, an entry, a throat and an exit, the diameter of the aperture in said direction decreasing over said entry to a minimum at said throat and increasing over said exit, said die being secured to the surface of the ground or being connected to the leading end of the pipe, guide means for said liner, and downstream of said pipe winch means for exerting a pull on a rope connected to the leading end of liner and guide means for said rope, characterised in that the entry of the die is convex over an axial length of said die between where the liner first contacts the die after bending inwardly and said throat of the die.

5. Apparatus according to claim 4 in which the shape of said axial length is defined in a sectional plane extending longitudinally of the liner and containing said axis, and in corresponding planes, as the shape of a circular arc.

6. Apparatus according to claim 4 in which said axial length of said die engages the whole of said liner where said die presents a convex outer surface up to said throat.

7. A method according to claim 2 in which said axial length of said die engages the whole of said concave outer surface of the liner up to said throat.

8. A method of lining a pipe with a polymer liner comprises pulling the liner through a die to reduce its diameter and through the pipe and on removal of the pulling load allowing the liner to revert to at least the minimum internal diameter of the pipe, the liner having a maximum diameter before the die and a minimum diameter in the die and the die having an aperture which is symmetrical with respect to a central, longitudinal axis and comprising in the direction in which the liner is passed, an entry, a throat and an exit, the diameter of the aperture in said direction decreasing over said entry to a minimum at said throat and increasing over said exit, the liner having an intermediate diameter after the die and before the liner enters the pipe, the force of pulling being such as partially to restrain die swell of the liner after its emergence from the throat and the liner bending towards said axis and in so doing presenting a convex outer surface, when viewed in a sectional plane extending longitudinally of the liner and containing said axis, and then the liner bending away from the axis and in so doing presenting a concave outer surface, when viewed in said plane, the liner continuously bending through its minimum diameter as it passes the throat and thereafter undergoing die swell resulting in said intermediate diameter, which enters the pipe, characterised in that the entry, when viewed in said plane, is convex over an axial length of said die between where the liner first contacts the die after bending inwardly and said throat, wherein the shape of said axial length is defined in said plane and in corresponding planes, as the shape of a circular arc.

9. A method as defined in claim 8 in which said axial length of said die engages the whole of said convex outer surface of the liner up to said throat.

10. In combination, apparatus for performing a method of lining a pipe with a polymer liner comprises pulling the liner through a die to reduce its diameter and through the pipe and on removal of the pulling load allowing the liner to revert to at least the minimum internal diameter of the pipe, the liner having a maximum diameter before the die and a minimum diameter in the die and the die having an aperture which is symmetrical with respect to a central, longitudinal axis and comprising in the direction in which the liner is passed, an entry, a throat and an exit, the diameter of the aperture in said direction decreasing over said entry to a minimum at said throat and increasing over said exit, the liner having an intermediate diameter after the die and before the liner enters the pipe, the force of pulling being such as partially to restrain die swell of the liner after its emergence from the throat and the liner bending towards said axis and in so doing presenting a convex outer surface, when viewed in a sectional plane extending longitudinally of the liner and containing said axis, and then the liner bending away from the axis and in so doing presenting a concave outer surface, when viewed in said plane, the liner continuously bending through its minimum diameter as it passes the throat and thereafter undergoing die swell resulting in said intermediate diameter, which enters the pipe, characterised in that the entry, when viewed in said plane, is convex over an axial length between where the liner first contacts the die after bending inwardly and said throat, said apparatus comprising upstream of the pipe a die having an aperture which is symmetrical with respect to a central, longitudinal axis and comprising in the direction in which the liner is passed, an entry, a throat and an exit, the diameter of the aperture in said direction decreasing over said entry to a minimum at said throat and increasing over said exit, said die being secured to the surface of the ground or being connected to the leading end of the pipe, guide means for said liner, and winch means downstream of said pipe for exerting a pull on a rope connected to the leading end of liner and guide means for said rope, characterised in that the entry of the die is convex over an axial length between where the liner first contacts the die after bending inwardly and said throat of the die wherein said axial length engages the whole of said liner where said liner presents a concave outer surface up to said throat.

* * * * *

UNITED STATES PATENT AND TRADEMARK OFFICE
CERTIFICATE OF CORRECTION

PATENT NO. : 5,839,475
DATED : Nov. 24, 1998
INVENTOR(S) : Leslie Maine; Kenneth Hicks It is certified that error appears in the above-indentified patent and that said Letters Patent is hereby corrected as shown below:

On the first page of the patent, the title is corrected as follows:

-- [54]     METHOD AND APPARATUS FOR LINING A PIPE WITH A POLYMER LINER--

Signed and Sealed this

Second Day of March, 1999

Attest:

Q. TODD DICKINSON

*Attesting Officer*   *Acting Commissioner of Patents and Trademarks*